US006871664B2

(12) United States Patent
O'Shea (10) Patent No.: US 6,871,664 B2
(45) Date of Patent: Mar. 29, 2005

(54) VALVE FLANGE CONNECTION (75) Inventor: Timothy Matthew O'Shea, Arlington Heights, IL (US)

(73) Assignee: Val-Matic Valve & Manufacturing Corp., Elmhurst, IL (US)

( * ) Notice: Subject to any disclaimer, the term of this patent is extended or adjusted under 35 U.S.C. 154(b) by 210 days.

(21) Appl. No.: 10/145,948

(22) Filed: May 15, 2002

(65) Prior Publication Data

US 2003/0213522 A1 Nov. 20, 2003

(51) Int. Cl.⁷ .............................................. F16K 15/03
(52) U.S. Cl. ................... 137/512.1; 251/148
(58) Field of Search ................... 251/148, 152; 137/515, 512.1

(56) References Cited

U.S. PATENT DOCUMENTS

| 4,079,751 A | 3/1978 | Partridge et al. |
| 4,257,451 A | 3/1981 | Paton |
| 4,751,938 A * | 6/1988 | Kerns et al. .............. 137/68.25 |
| 5,246,032 A * | 9/1993 | Muddiman ............... 137/512.1 |
| 5,301,709 A | 4/1994 | Gasaway |
| 5,711,343 A | 1/1998 | Beckett |

* cited by examiner

Primary Examiner—Kevin Lee
(74) Attorney, Agent, or Firm—Sonnenschein Nath & Rosenthal LLP (57) ABSTRACT A flange is provided for a valve which extends in a radial direction outwardly from the valve and has a peripheral edge. The peripheral edge is comprised of a series of outer surfaces positioned at or beyond a first radial distance from a center point of the valve, and may be in the form of tabs, and an alternating series of inner surfaces positioned at or within a second radial distance from the valve or flange center point, as intervening portions. At least one of the outer surfaces and inner surfaces may be sized and arranged to supportingly engage a plurality of series of connecting bolts which extend perpendicular to the radial direction, wherein the plurality of series of connecting bolts are arranged on bolt circles of different diameters relative to the valve.

27 Claims, 5 Drawing Sheets

VALVE FLANGE CONNECTION

BACKGROUND OF THE INVENTION

The present invention relates to a configuration for a flange and more particularly for a flange used on a valve, such as a check valve located in a pipe run.

Valves arranged in a pipe run, such as check valves, are well known. A particular type of check valve which is utilized in such an orientation is what is referred to as a wafer style check valve or dual disk check valve such as those disclosed in U.S. Pat. Nos. 4,079,751; 4,257,451; 5,301,709 and 5,711,343.

In these check valves, an outer cylindrical valve body typically mates at each end with a pipe run wherein the ends of the adjoining pipes are provided with flanges and the check valve is captured between the pipe flanges such as shown in FIGS. 2 and 3 of U.S. Pat. No. 4,079,751.

Typically the valve body is also provided with one or more flanges which are sized to engage the sides of the bolts extending between the pipe flanges. The bolts are arranged in a bolt circle and thus the radial inside surface of the bolts define points in a circle of the same diameter as the valve flange.

In a wafer style check valve of the type described above, there are two generally semicircular disks which are mounted to rotate about a hinge pin which passes through the center of the valve body in an axis perpendicular to the pipe axis. For the valve to operate properly, it is important that the valve be installed so that it is closely centered in the pipeline and with the hinge pin oriented very close to the vertical. Centering is necessary so that the disks do not strike the mating pipe. In horizontal pipe applications, gravity tends to force the valve down from center during installation and over time. Vertical orientation is important so that the motion of the disks is not affected unevenly by gravity. Therefore, there is typically only one correct rotational orientation for the valve body.

Different sized pipelines have different sized, but standard, bolt circles for the connecting bolts of the flanges of adjoining pipes. The valve bodies are generally cast with the outside flange of the body having a specific diameter which will mate to one bolt pattern and will support the weight of the valve.

However, there are actually different standards for bolt circles, particularly differences between U.S. bolt patterns and ISO (European) metric bolt patterns. This different diameter of bolt circles of the different standards have required different sized valve bodies and valve flanges to accommodate each of the different bolt circle standards.

It would be an advantage if there were provided an arrangement whereby a single valve body could be utilized to accommodate more than one bolt circle diameter.

SUMMARY OF THE INVENTION

In an embodiment, object of the present invention is to provide a unique flange configuration for an in-line mounted valve that can be used with multiple bolt patterns while simultaneously centering the valve within the connecting bolts. The novel arrangement of tabs and intervening portions on the exterior of the body, as well as arcuate shapes, allows the inventive flange of the valve to be used with both U.S. customary bolt patterns and ISO (European) metric bolt patterns. Further, the shape of the flange can be arranged to allow for as-cast shapes, providing further economy. Configurations embodying the principles of the present invention can be provided which require no machining or special casting methods, such as the use of loose molding cores.

With the capability for universal mounting, the manufacturer can benefit from a greater product economy of scale in manufacturing. The members of the valve supply chain benefit from a universal mounting arrangement because they are able to stock fewer valve types and configurations. Since valves are stocked in many sizes, materials and types, a universal mounting arrangement over a range of pipe sizes can provide significant savings.

The tabs and intervening flange portions can be arranged to center the valve for different types of bolt patterns and still provide for correct rotational orientation of the valve. As described above, certain check valves require that the valve be installed with an exact orientation (i.e., the valve pin must be exactly vertical for proper operation). The correct orientation of the stem allows the closure members to rotate without binding and provide for a consistent valve operation in terms of set point or closing characteristics.

Finally, the valve body and flange can be designed as a casting which can be produced without the need for cores or other expensive casting methods. All points along the outside shape of the valve body and flange are capable of being pulled away from a parting line without crossing over any other points. This way a casting pattern can be pressed into a sand mold and lifted out to make the exact impression in the sand.

DETAILED DESCRIPTION OF THE PREFERRED EMBODIMENT

The present invention relates to a flange and in particular a flange for use with a valve body to be inserted in a pipeline. Many different types of valves can utilize the particular flange embodying the principles of the present invention, however a particular embodiment is illustrated in a check valve and in particular a wafer style check valve.

Figure 1:
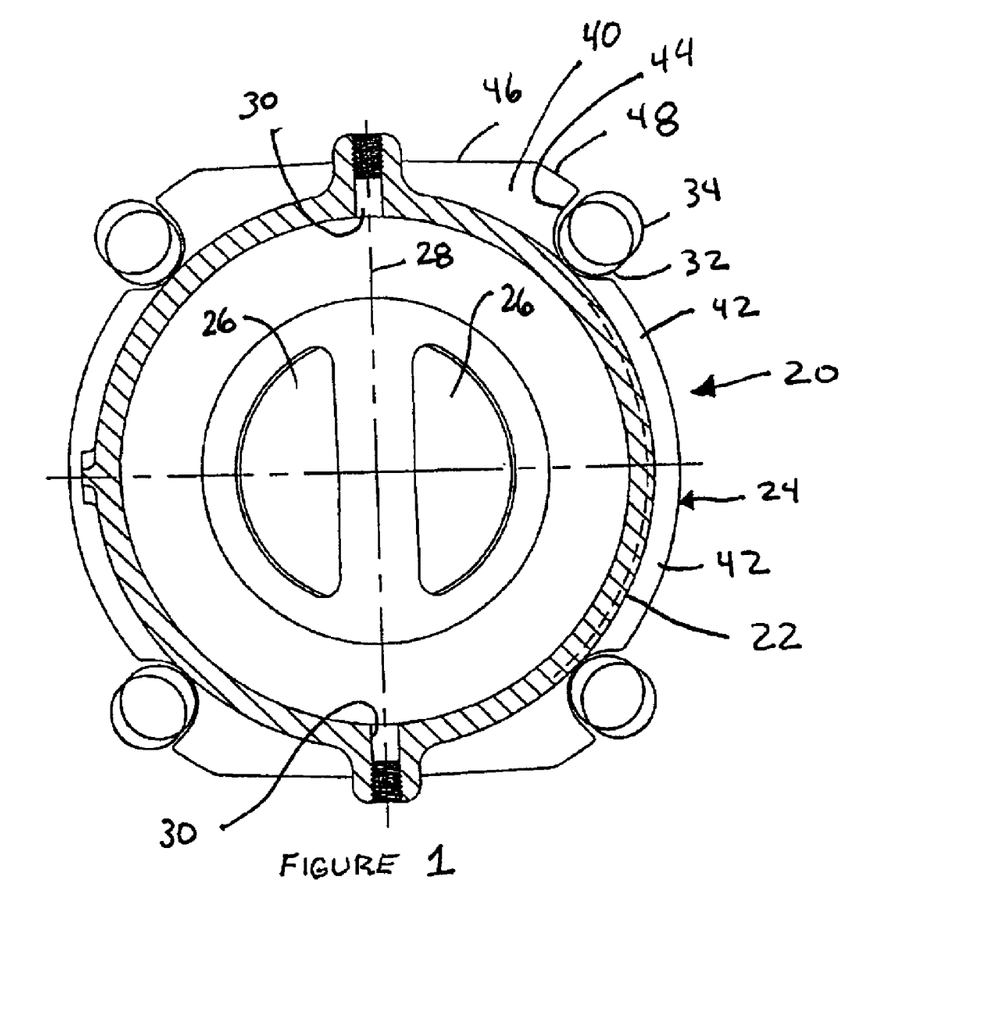
FIG. 1 is a side sectional view of a first embodiment of a valve and flange designed for two different four-bolt patterns.

In FIG. 1 a wafer style check valve is shown generally at 20 and includes a generally cylindrical valve body 22 with a flange 24 having a peripheral edge extending radially outwardly from the valve body. The check valve has a pair of D-shaped disks 26 which rotate about a vertical axis 28, such as on a hinge pin which can be seated in appropriate journal openings 30 in the valve body 22. It is typical for in-line valves to be secured to the pipeline by being sandwiched between two flanged ends of a pipe with the flanged ends of the pipe being secured together by threaded bolts. In some valves, such as the check valve illustrated, it is important to rotationally orient the valve in a particular manner, in this case, with the hinge pin axis 28 being arranged vertically. There are standardized bolt patterns for the pipe flanges, however the standardized patterns vary depending upon the pipe size and also depending upon whether the pipe follows U.S. standards or metric standards. In some cases the bolts, which are arranged in a circle referred to as a bolt circle, are provided in bolt circles of different diameters with a common number and generally identical angular orientation of the bolts, while in other instances the number of bolts varies as well as the diameter of the bolt circle, as does the angular placement of the bolts.

In FIG. 1 there is illustrated a first set of 4 bolts 32 arranged in a bolt circle which is slightly smaller than the bolt circle of a second series of 4 bolts 34. To accommodate these two different bolt arrangements with a single flange 24, the peripheral edge of the flange incorporating the present invention is provided with a series of alternating tabs 40 and intervening portions 42 which vary from each other in their radial extent. The tabs 40 provide a radial outer surface positioned at or beyond a first radial distance from the valve body 22 and an alternating series of inner surfaces positioned at or within a second, smaller radial distance from the valve body. Further, arcuate surfaces 44 may be arranged between at least some adjacent tabs 40 and intervening sections 42. In the embodiment illustrated in FIG. 1, the arcuate surfaces 44 are recessed radially inwardly from both the tab radial dimension and the intervening section radial dimension, and could recess as far as the outer diameter of the valve body 22. This arcuate surface 44 is arranged to accommodate the bolt diameters of the first series of bolts 32 and the second series of bolts 34 such that there will be a portion of the flange which is directly adjacent to the bolt. In this manner, the valve will be centered with the pipe axis and will be appropriately oriented and held in a rotational sense so that the pivot axis 28 will be arranged vertically.

In the top right quadrant of the flange 24 as shown in FIG. 1, and starting with the uppermost portion of the flange, there is provided a peripheral surface 46 which extends laterally away from the rotational axis line 28 (which also can serve as a parting line when the valve body 22 is formed as a casting). In such an arrangement, the surface 46 is angled slightly downwardly, for example, at a 2° angle relative to perpendicular with the parting line 28 to serve as a draft angle to allow the casting process to proceed so that the mold can be pulled away from the casting without interference. In order to reduce material, an arc or angled surface 48 extends from the surface 46 to the arcuate surface 44. The surfaces 46 and 48 thus define the tab 40.

The intervening portion 42 extends from the arcuate surface 44 along a generally circular path, as measured from a center point of the valve, downwardly. This intervening portion 42 extends radially outwardly sufficient so that it will prevent rotation of the valve relative to the bolts 32, 34 and still be small in diameter to minimize the amount of material used in the valve. This upper right hand quadrant is duplicated, in mirror symmetry fashion in the upper left quadrant and in the lower right quadrant, and in the lower left quadrant as well. The tab 40 thus presents an outer surface 46, 48 which is positioned at or beyond a first radial distance from the valve body 22 and the intervening portion 42 presents an inner surface positioned at or within a second, smaller radial distance from the valve body. The arcuate surface 44 comprises a connecting surface extending between the outer surfaces and the inner surface.

Figure 2:
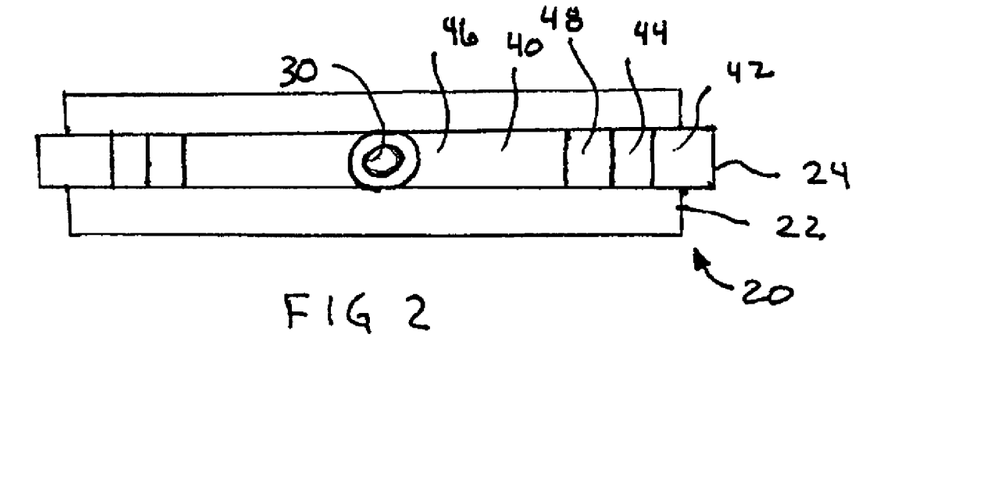
FIG. 2 is a top elevational view of a valve and flange according to the first embodiment with a single central flange.

FIG. 2 illustrates an embodiment of the valve 20 of FIG. 1 wherein a single flange 24 is provided, located centrally along a length of the valve body 22.

Figure 3:
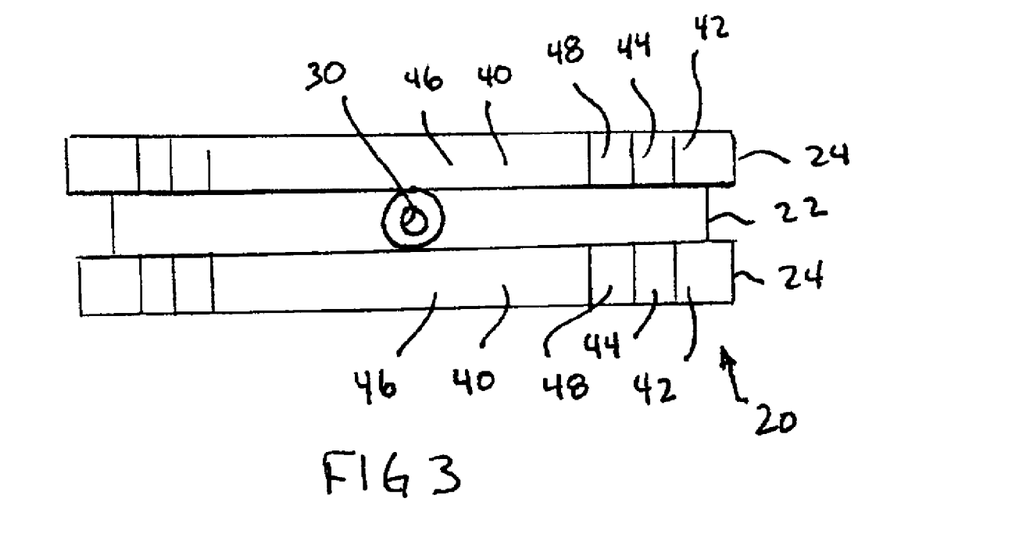
FIG. 3 is a top elevational view of a valve and flange according to the first embodiment with a double flange.

FIG. 3 illustrates an embodiment of the valve 20 of FIG. 1 wherein two flanges 24 are provided, each at an opposite end of the length of the valve body 22. The number and arrangement of flanges can vary in each of the embodiments, described herein as required by space and strength considerations.

Figure 4:
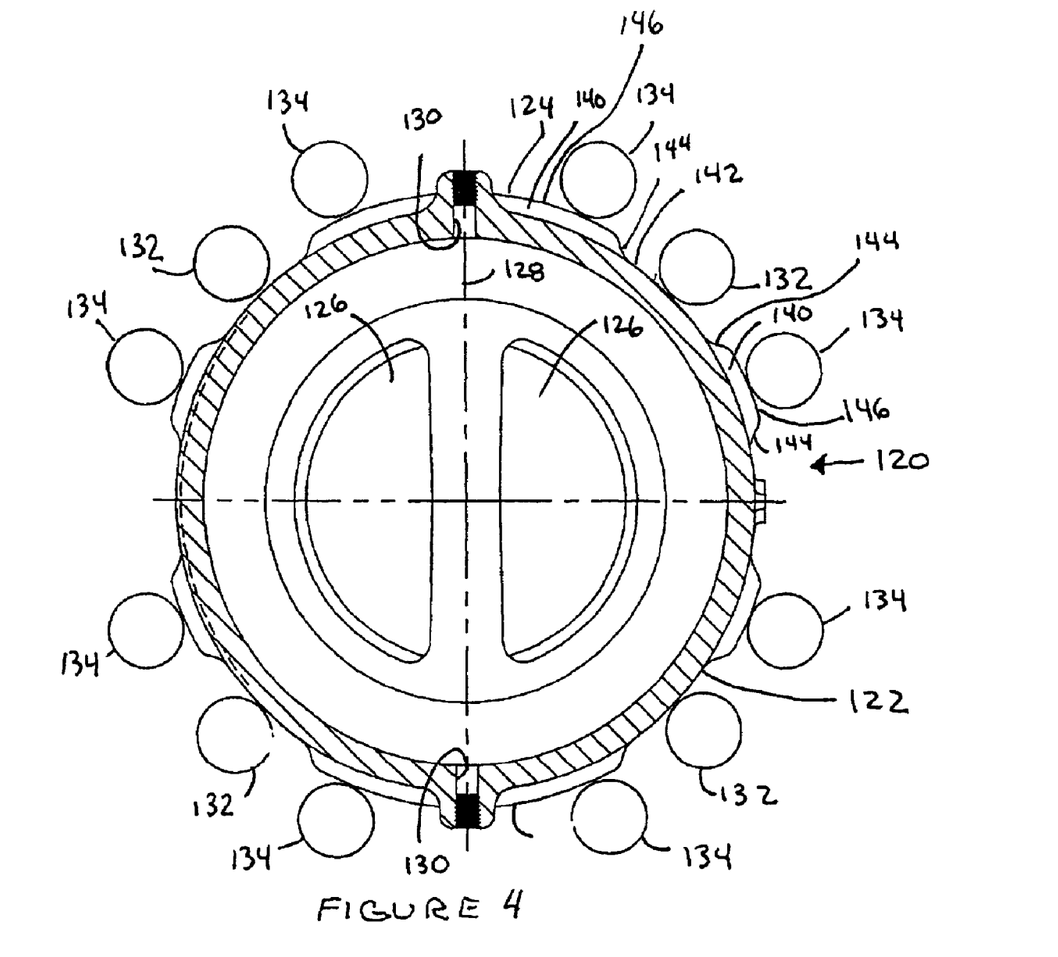
FIG. 4 is a side sectional view of a valve and flange designed for a four or eight-bolt pattern.

In FIG. 4, another size valve arrangement is illustrated in which there is a check valve 120 comprising a valve body 122 and a surrounding flange 124 having a peripheral edge extending radially outwardly from the valve body. The check valve again has a pair of D-shaped disks 126 which rotate about a vertical axis 128, such as on a hinge pin which can be seated in appropriate journal openings 130 in the valve body 122. Similar in many respects to the valve arrangement described in the preceding embodiment.

In FIG. 4 there are illustrated a first set of 4 bolts 132 arranged in a bolt circle which is slightly smaller than the bolt circle of a second series of 8 bolts 134. To accommodate these two different bolt arrangements with a single flange 124, the peripheral edge of the flange incorporating the present invention is provided with a series of alternating tabs 140 and intervening portions 142 which vary from each other in their radial extent. Further, arcuate surfaces 144 are arranged between adjacent tabs 140 and intervening portions 142. In the embodiment illustrated in FIG. 4, the intervening portions have of the same radial dimension as the valve body 122. The arcuate surfaces 144 connect the tab radial dimension and the intervening portion radial dimension. The first series of bolts 132 is formed on a bolt circle slightly larger than an outer diameter of the valve body 122 such that an inner facing surface of the bolt shanks will be positioned closely adjacent to the intervening portions 142. The second series of bolts 134 has a larger bolt circle diameter and the radial extent of the tabs is arranged such that an inner facing surface of the bolt shanks will be positioned closely adjacent to the outer surface of the tabs. In this manner, the valve will be centered with the pipe axis.

In the top right quadrant of the flange 124 as shown in FIG. 4, and starting with the uppermost portion of the flange, there is provided a peripheral surface 146 which extends arcuately and away from the rotational axis line 128 which also can serve as a parting line when the valve body 122 is formed as a casting. The arcuate shape reduces material and weight and allows the casting process to proceed so that the mold can be pulled away from the casting without interference. The arcuate surface 144 joins the peripheral surface 146 with the intervening portions 142. The surfaces, 146 and 144 thus define a tab 140.

The intervening portion 142 extends from the arcuate surface 144 along a generally circular path downwardly. A second tab 140 is provided and is formed by another peripheral surface 146, joined to the intervening portions 142 via arcuate surfaces 144. This upper right hand quadrant is duplicated, in mirror symmetry fashion in the upper left quadrant and in the lower right quadrant, and in the lower left quadrant as well. The tab 140 thus presents an outer surface 146 which is positioned at or beyond a first radial distance from the valve body 122 and the intervening portion 142 presents an inner surface positioned at or within a second, smaller radial distance from the valve body. The arcuate surface 144 comprises a connecting surface extending between the outer surfaces and the inner surface.

Figure 5:
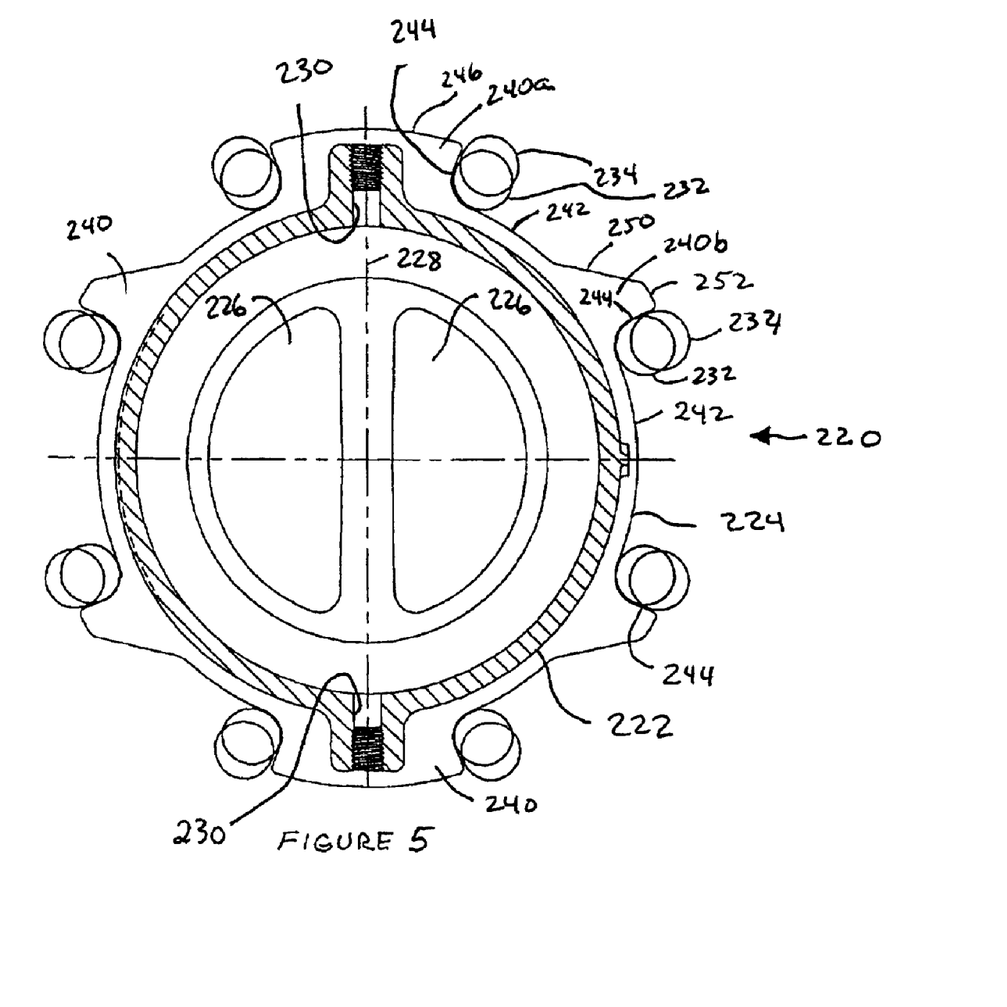
FIG. 5 is a side sectional view of a valve and flange designed for two different eight-bolt patterns.

In FIG. 5 another size valve arrangement is shown generally at 220 and includes a generally cylindrical valve body 222 with a flange 224 having a peripheral edge extending radially outwardly from the valve body. The check valve again has a pair of D-shaped disks 226 which rotate about a vertical axis 228, such as on a hinge pin which can be seated in appropriate journal openings 230 in the valve body 222 similar in many respects to the valve arrangement described in the preceding embodiment.

In FIG. 5 there are illustrated a first set of 8 bolts 232 arranged in a bolt circle which is slightly smaller than the bolt circle of a second series of 8 bolts 234. To accommodate these two different bolt arrangements with a single flange 224, the peripheral edge of the flange incorporating the present invention is provided with a series of alternating tabs 240 and intervening portions 242 which vary from each other in their radial extent. Further, arcuate surfaces 244 are arranged between some adjacent tabs 240 and intervening sections 242. In the embodiment illustrated in FIG. 5, the arcuate surfaces 244 extend from the tab radial dimension to the intervening section radial dimension. This arcuate surface 244 is arranged to accommodate the bolt diameters of the first series of bolts 232 and the second series of bolts 234 such that there will be a portion of the flange which is directly adjacent to either bolt. In this manner, the valve will be centered with the pipe axis and will be appropriately oriented in a rotational sense so that the pivot axis 228 will be arranged vertically.

In the top right quadrant of the flange 224 as shown in FIG. 5, and starting with the uppermost portion of the flange, there is provided a peripheral arcuate surface 246 which extends laterally away from the rotational axis line 228 which also can serve as a parting line when the valve body 222 is formed as a casting. In such an arrangement, the arcuate shape of the surface 246 allows the casting process to proceed so that the mold can be pulled away from the casting without interference. The intervening portion 242 extends from the arcuate surface 244 along a generally circular path downwardly. This intervening portion extends radially outwardly sufficiently so that it will be positioned adjacent the circle of bolts 232 and still be small in diameter to minimize the amount of material used in the valve. A ramp surface 250 extends from the intervening portion 242 at an angle below horizontal to an outer peripheral surface 252. The surfaces 246 and 244 thus define a top tab 240a. The ramp surface 250, the peripheral surface 252 and the arcuate surface 244 thus define a side tab 240b. This upper right hand quadrant is duplicated, in mirror symmetry fashion in the upper left quadrant and in the lower right quadrant, and in the lower left quadrant as well so that each quadrant has a top (or bottom) tab and a side tab, bolts separated by an intervening portion. The tab 240 thus presents an outer surface 246, 252 which is positioned at or beyond a first radial distance from the valve body 222 and the intervening portion 242 presents an inner surface positioned at or within a second, smaller radial distance from the valve body. The arcuate surface 244 comprises a connecting surface extending between the outer surfaces and the inner surface.

Figure 6:
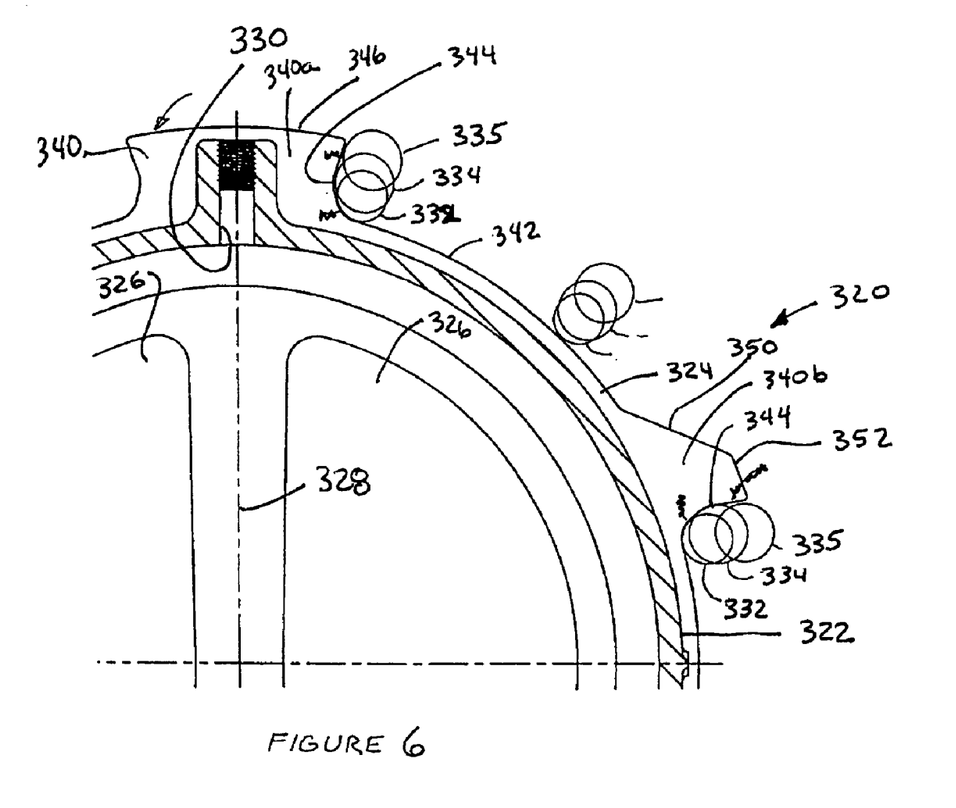
FIG. 6 is a partial side sectional view of a valve body and flange designed to accommodate multiple bolt circle diameters.

In FIG. 6 another size valve arrangement is shown generally at 320 in the top right quadrant only and includes a generally cylindrical valve body 322 with a flange 324 extending radially outwardly from the valve body. The check valve again has a pair of D-shaped disks 326 which rotate about a vertical axis 328, such as on a hinge pin which can be seated in appropriate journal openings 330 in the valve body 322 similar in many respects to the valve arrangement described in the preceding embodiments.

In FIG. 6 there are illustrated a first set of 12 bolts 332 arranged in a bolt circle which is slightly smaller than the bolt circle of a second series of 12 bolts 334. There is also illustrated a third set of bolts 335 arranged in a bolt circle larger than the bolt circle of the second series of bolts 334. To accommodate these three different bolt arrangements with a single flange 324, the peripheral edge of the flange incorporating the present invention is provided with a series of alternating tabs 340 and intervening portions 342 which vary from each other in their radial extent. Further, arcuate surfaces 344 are arranged between some adjacent tabs 340 and intervening sections 342. In the embodiment illustrated in FIG. 6, the arcuate surfaces 344 extend from the tab radial dimension to the intervening section radial dimension. This arcuate surface 344 is arranged to accommodate the bolt diameters of the first series of bolts 332, the second series of bolts 334 and the third series of bolts 335 such that there will be a portion of the flange which is directly adjacent to a bolt of each series. In this manner, the valve will be centered with the pipe axis and will be appropriately oriented in a rotational sense so that the pivot axis 328 will be arranged vertically.

In the top right quadrant of the flange 324 as shown in FIG. 6, and starting with the uppermost portion of the flange, there is provided a peripheral arcuate surface 346 which extends laterally away from the rotational axis line 328 which also can serve as a parting line when the valve body 322 is formed as a casting. In such an arrangement, the arcuate shape of the surface 346 allows the casting process to proceed so that the mold can be pulled away from the casting without interference. The intervening portion 342 extends from the arcuate surface 344 along a generally circular path downwardly. This intervening portion extends radially outwardly sufficient so that it will be positioned adjacent the circle of bolts 232 and still be small in diameter to minimize the amount of material used in the valve. The surfaces 346 and 344 thus define a top tab 340a. A ramp surface 350 extends from the intervening portion 342 at an angle below horizontal to an outer peripheral surface 352. The ramp surface 350, the outer peripheral surface 352 and the arcuate surface 344 thus define a side tab 340b. This upper right hand quadrant is duplicated, in mirror symmetry fashion in the upper left quadrant and in the lower right quadrant, and in the lower left quadrant as well so that each quadrant has a top (or bottom) tab and a side tab, separated by an intervening portion. The tab 340 thus presents an outer surface 346, 352 which is positioned at or beyond a first radial distance from the valve body 322 and the intervening portion 342 presents an inner surface positioned at or within a second, smaller radial distance from the valve body. The arcuate surface 344 comprises a connecting surface extending between the outer surfaces and the inner surface.

In this embodiment only some of the bolts are positioned adjacent a tab 340, while others are located adjacent to or slightly spaced away from the intervening portion 342 located between tabs. A sufficient number of bolts, however, are located adjacent a tab to provide the necessary support for the valve body, as well as to prevent rotation of the valve relative to the bolts.

As is apparent from the foregoing specification, the invention is susceptible of being embodied with various alterations and modifications which may differ particularly from those that have been described in the preceding specification and description. The particular type of valve utilizing the inventive flange can be changed, the exact spacing and arrangement of the tabs and intervening portion can be modified, as well as the shape of the tabs and their radial extent, as needed to accommodate different series of bolt patterns and so that each flange will accommodate a plurality of different standard bolt patterns on different bolt circles. It should be understood that I wish to embody within the scope of the patent warranted hereon all such modifications as reasonably and properly come within the scope of my contribution to the art.

I claim:

1. A flange for a check valve extending in a radial direction outwardly from said check valve and having a peripheral edge;

said peripheral edge comprising a plurality of alternating tabs and intervening portions wherein said tabs extend radially further outwardly than said intervening portions and wherein an arcuate surface connects at least one side of said tabs to said intervening portions, and further wherein said arcuate surface is sized to receive a plurality of connecting bolts of said check valve which extend perpendicular to said radial direction wherein said connecting bolts are arranged on bolt circles of different diameters relative to said check valve.

2. A flange according to claim 1, wherein at least some of said tabs have an outer arcuate surface.

3. A flange according to claim 1, wherein at least some of said intervening portions have an outer arcuate surface.

4. A flange according to claim 1, wherein an arcuate surface connects at least one side of said tabs to said intervening portions.

5. A flange according to claim 4, wherein an arcuate surface connects both sides of at least some of said tabs to said intervening portions.

6. A flange according to claim 4, wherein said arcuate surface extends radially inwardly further than said intervening portions.

7. A flange according to claim 1, wherein a linear surface connects at least one side of at least some of said tabs to said intervening portions.

8. A flange according to claim 4, wherein said arcuate surface extends tangentially from said intervening portion outwardly to a radially outer surface of said tab.

9. A generally circular flange for a valve extending in a radial direction outwardly from a center point of said flange and having a peripheral edge, said peripheral edge comprising a series of outer surfaces positioned at or beyond a first radial distance from said center point and an alternating series of inner surfaces positioned at or within a second radial distance from said center point, and connecting surfaces extending between said outer surfaces and said inner surfaces, wherein at least one of said outer surfaces, said inner surfaces and said connecting surfaces are sized and arranged to supportingly engage a plurality of connecting bolts of said valve which extend perpendicular to said radial direction, wherein said connecting bolts are arranged on bolt circles of different diameters relative to said check valve.

10. A generally circular flange for a valve extending in a radial direction outwardly from a center point of said flange and having a peripheral edge, said peripheral edge comprising a series of outer surfaces positioned at or beyond a first radial distance from said center point and an alternating series of inner surfaces positioned at or within a second radial distance from said center point, and connecting surfaces extending between said outer surfaces and said inner surfaces, wherein at least some of said outer surfaces are arcuate and supportingly engage a portion of said plurality of connecting bolts arranged on a bolt circle of a relatively greater diameter and at least some of said inner surfaces are arcuate and supportingly engage a portion of said plurality of connecting bolts arranged on a bolt circle of a relatively lesser diameter.

11. A valve comprising:

a valve body adapted to be received in a pipeline, a flange having a peripheral edge extending from said valve body radially in comparison to a longitudinal axis of said pipeline;

said peripheral edge comprising a series of outer surfaces positioned at or beyond a first radial distance from said valve body and an alternating series of inner surfaces positioned at or within a second, smaller radial distance from said valve body, wherein at least one of said outer surfaces and inner surfaces are sized and arranged to supportingly engage a plurality of series of connecting bolts which extend parallel to said longitudinal axis, wherein said plurality of series of connecting bolts are arranged on bolt circles of different diameters relative to said valve.

12. A flange for a check valve extending in a radial direction outwardly from a valve body of said check valve and having a peripheral edge, said peripheral edge comprising a plurality of alternating tabs and intervening portions wherein said tabs extend radially further outwardly than said intervening portions, at least one of said plurality of tabs and intervening portions are sized and arranged to supportingly engage a plurality of series of connecting bolts which extend parallel to a longitudinal axis of said valve body, said flange being a cast member formed with a casting mold, and having a parting line for the casting mold defining a plane intersecting a first point midway between areas for supportingly engaging two adjacent bolts and a second point midway between areas for supportingly engaging two adjacent bolts which are diametrically opposite said first two adjacent bolts, said flange configured to permit a straight pulling away of the mold from said flange perpendicular to said parting line without interference.

13. A flange according to claim 12, wherein at least some of said tabs have an outer arcuate surface.

14. A flange according to claim 12, wherein at least some of said intervening portions have an outer arcuate surface.

15. A flange according to claim 12, wherein an arcuate surface connects at least one side of said tabs to said intervening portions.

16. A flange according to claim 15, wherein an arcuate surface connects both sides of at least some of said tabs to said intervening portions.

17. A flange according to claim 15, wherein said arcuate surface extends radially inwardly further than said intervening portions.

18. A flange according to claim 12, wherein a linear surface connects at least one side of at least some of said tabs to said intervening portions.

19. A flange according to claim 15, wherein said arcuate surface extends tangentially from said intervening portion outwardly to a radially outer surface of said tab.

20. A flange according to claim 12, wherein at least some of said intervening portions of said flange are flush with an outer surface of said valve body.

21. A flange for a valve extending in a radial direction outwardly from a center point of said flange and having a peripheral edge, wherein said valve includes a valve body adapted to be received in a pipeline, said flange comprising:

a peripheral edge extending from said valve body radially in comparison to a longitudinal axis of said pipeline, said flange configured to secure said valve body to said pipeline with a predetermined angular orientation relative to said longitudinal axis;

said peripheral edge comprising a series of outer surfaces positioned at or beyond a first radial distance from said center point and an alternating series of inner surfaces positioned at or within a second radial distance from said center point, and connecting surfaces extending between said outer surfaces and said inner surfaces;

at least one of said outer surfaces and inner surfaces being sized and arranged to supportingly engage a plurality of series of connecting bolts which extend parallel to said longitudinal axis, without changing said angular orientation of said valve body relative to said pipeline, said flange being a cast member formed with a casting mold, and having a parting line for the casting mold defining a plane intersecting a first point midway between areas for supportingly engaging two adjacent bolts and a second point midway between areas for supportingly engaging two adjacent bolts which are diametrically opposite said first two adjacent bolts, said flange configured to permit a straight pulling away of the mold from said flange perpendicular to said parting line without interference.

22. A generally circular flange according to claim 21, wherein at least some of said connecting surfaces are arcuate and supportingly engage said plurality of connecting bolts.

23. A generally circular flange according to claim 21, wherein said flange can be divided into four quadrants, all joined at said center point, with each quadrant being mirror symmetric with its adjacent quadrants.

24. A valve comprising:

a valve body adapted to be received in a pipeline;

a flange having a peripheral edge extending from said valve body radially in comparison to a longitudinal axis of said pipeline, said flange configured to secure said valve body to said pipeline with a predetermined angular orientation relative to said pipeline around said longitudinal axis;

said peripheral edge comprising a series of outer surfaces positioned at or beyond a first radial distance from said valve body and an alternating series of inner surfaces positioned at or within a second, smaller radial distance from said valve body, at least one of said outer surfaces and inner surfaces being sized and arranged to supportingly engage a plurality of series of connecting bolts which extend parallel to said longitudinal axis, without changing said angular orientation of said valve body relative to said pipeline.

25. A valve according to claim 24, comprising a wafer style check valve.

26. A valve according to claim 24 including connecting surfaces extending between said outer surfaces and said inner surfaces.

27. A valve according to claim 24, wherein at least some of said inner surfaces are flush with said valve body.

* * * * *